US010257031B1

(12) United States Patent
Lamoreaux et al.

(10) Patent No.: US 10,257,031 B1
(45) Date of Patent: Apr. 9, 2019

(54) DYNAMIC NETWORK CAPACITY AUGMENTATION FOR SERVER RACK CONNECTIVITY

(71) Applicant: Amazon Technologies, Inc., Seattle, WA (US)

(72) Inventors: Tyson James Lamoreaux, Normandy Park, WA (US); Justin Oliver Pietsch, Bothell, WA (US); Brian Myungjin Choi, Seattle, WA (US); Daril Alexandre Vilhena, Seattle, WA (US); Edward Crabbe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 15/055,267

(22) Filed: Feb. 26, 2016

(51) Int. Cl.
*H04L 12/775* (2013.01)
*H04L 12/24* (2006.01)
*H04L 12/741* (2013.01)

(52) U.S. Cl.
CPC ........ *H04L 41/0806* (2013.01); *H04L 41/042* (2013.01); *H04L 41/0813* (2013.01); *H04L 45/745* (2013.01)

(58) Field of Classification Search
CPC ....... H04L 45/66; H04L 61/103; H04L 49/25; H04W 16/14
See application file for complete search history.

(56) References Cited

U.S. PATENT DOCUMENTS

| | | | | |
|---|---|---|---|---|
| 2012/0311127 | A1* | 12/2012 | Kandula ............... | H04W 16/28 709/224 |
| 2013/0198346 | A1* | 8/2013 | Jubran .................... | H04L 41/12 709/220 |
| 2014/0089506 | A1* | 3/2014 | Puttaswamy Naga ...................... | H04L 45/42 709/225 |
| 2016/0036838 | A1* | 2/2016 | Jain ..................... | H04L 63/1416 726/23 |
| 2017/0026263 | A1* | 1/2017 | Gell .................... | H04L 43/0882 |
| 2017/0104640 | A1* | 4/2017 | Jain ..................... | H04L 41/5022 |

OTHER PUBLICATIONS

"Data Center Top-of-Rack Architecture Design", Cisco Systems, Inc., http://www.cisco.com/c/en/us/products/collateral/switches/nexus-5000-series-switches/white_paper_c11-522337.pdf, retrieved on Dec. 23, 2015, 14 Pages. (2009).

\* cited by examiner

*Primary Examiner* — Shukri Taha
(74) *Attorney, Agent, or Firm* — Klarquist Sparkman, LLP

(57) ABSTRACT

Techniques for dynamic augmentation of server rack network capacity are provided herein. Network nodes are described that are connected between server rack switches and a rack aggregation layer device. A port allocation controller is also described that can automatically reconfigure the network nodes to create connections, via the network nodes, between the rack aggregation layer device and the server rack switches. These network node connections can be used to alter the network capacities of the server rack switches in response to changing network demands.

20 Claims, 9 Drawing Sheets

DYNAMIC NETWORK CAPACITY AUGMENTATION FOR SERVER RACK CONNECTIVITY

BACKGROUND

In some large data centers, servers are contained in multiple server racks. All servers in a given server rack communicate with the rest of the network via a switch that is also contained in the server rack (often referred to as a top-of-rack switch because it is commonly located in the top slot of the server rack). The top-of-rack switches of the server racks are then connected to a rack aggregation layer router, which serves as an ingress and egress point for network traffic traveling between the connected top-of-rack switches and a broader network. FIG. 2A depicts a diagram of an example system 200 with server racks and a rack aggregation layer router in such a configuration (prior art). The server racks 201A-B contain top-of-rack switches 210A-B, respectively. The top-of rack switches 210A-B contain multiple ports 212 directly connected to ports 232 of a rack aggregation layer router 230.

DETAILED DESCRIPTION

A rack aggregation layer device has a capacity for data transmission across a network that is limited by the number the ports that the rack aggregation layer device possesses. This effectively limits the number of server rack switches that can be directly connected to a given rack aggregation layer device. When all of the downlink ports of a given rack aggregation layer device have been connected to server rack switches, additional rack aggregation layer devices must be added before more server racks can be connected to the network.

Furthermore, in many cases the uplink connections from the server rack switches to the rack aggregation layer device are overprovisioned to account for possible spikes in network traffic. Such overprovisioning requires each server rack switch to have connections to a greater number of the rack aggregation layer device's ingress ports than is necessary to meet each server rack's ordinary levels of network demand. This has the effect of reducing the number of server rack switches that can be connected to a given rack aggregation layer device. In scenarios where spikes in network traffic are infrequent, this configuration can cause several of the rack aggregation layer device's downlink ports to be underutilized for extended periods of time. The utilization of the rack aggregation layer device's downlink ports could be increased by reducing the number of ports allocated to each server rack switch and connecting more server rack switches to the rack aggregation layer device. However, this would reduce the network capacity available to each server rack switch and increase the likelihood that a spike in network traffic will create network demand for a given server rack switch that exceeds its available uplink capacity.

The technologies described herein solve these problems by using network nodes and a port allocation controller to allow more server rack switches to be connected to rack aggregation layer devices without reducing the network capacity available to server rack switches.

Figure 1:
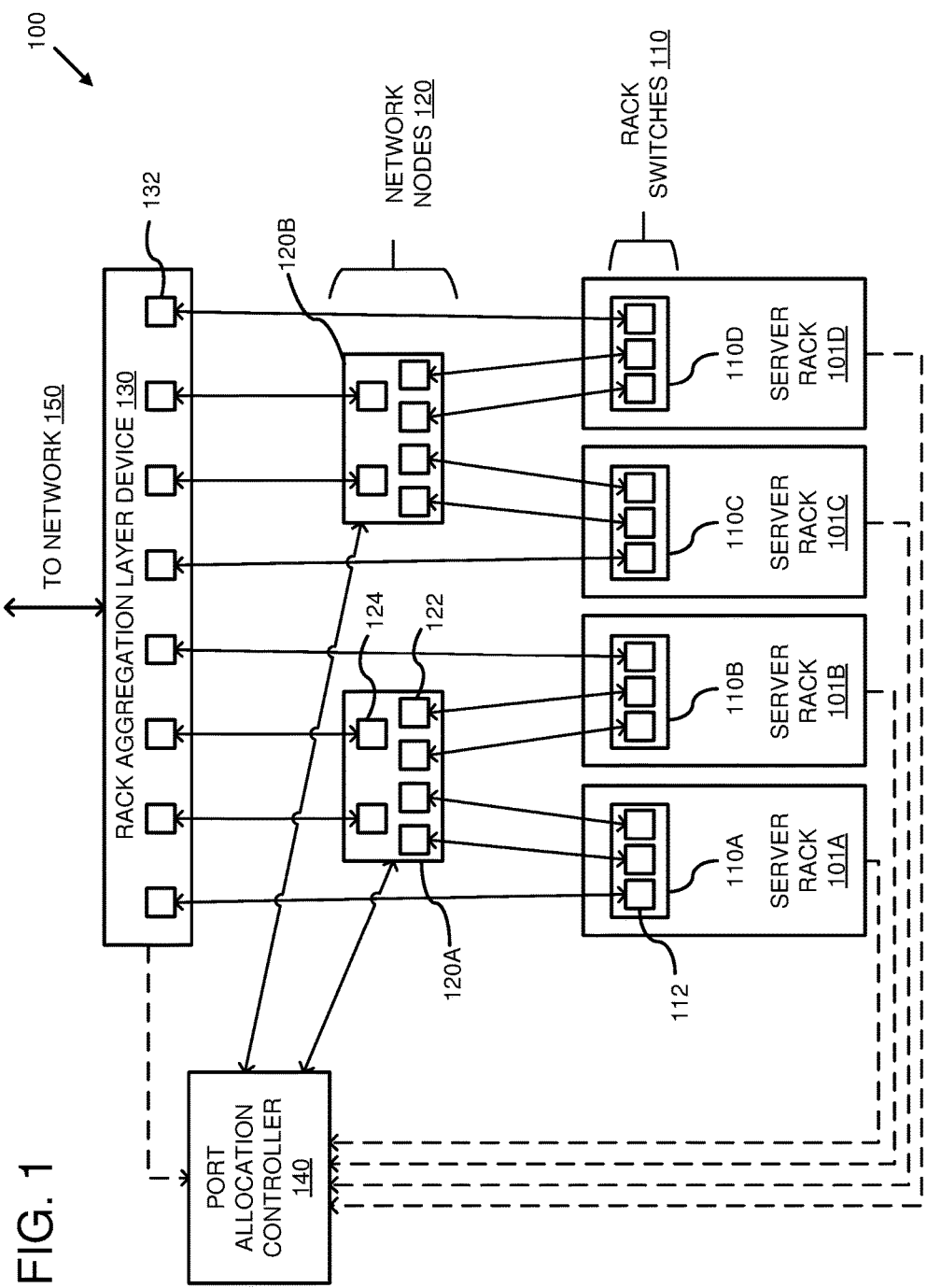
FIG. 1 is an example system diagram showing a plurality of network nodes organized as an intermediate layer between a rack aggregation layer device and a plurality of server racks.

FIG. 1 is a diagram of example system 100, wherein a plurality of network nodes 120 are organized as an intermediate layer between multiple rack switches 110 and a rack aggregation layer device 130.

In example system 100, a plurality of server racks 101A-D comprise rack switches 110A-D, respectively. The rack switches comprise multiple ports 112. A first group of the ports 112 are connected to ports 122 of network nodes 120A-B, while a second group of ports 112 are connected directly to ports 132 of rack aggregation layer device 130. Rack switches 110A-D are configured to transfer network communications between rack aggregation layer device 130 and servers (not illustrated) residing in server racks 101A-D. Rack switches 110A-D are configured to use ports 112 to transmit data to and receive data from rack aggregation layer device 130. Rack aggregation layer device 130, in turn, is configured to receive data from rack switches 110A-D using ports 132, to transmit received data out to network 150, and to transmit data received from network 150 to rack switches 110A-D using ports 132.

Rack switches 110A-D are also configured to transmit data to network nodes 120A-B via ports 112 connected to network node ports 122. Network nodes 120A-B are configured to transmit data received from rack switches 110A-D to rack aggregation layer device 130 via ports 124 connected to ports 132.

In a default state, rack switches 110A-D communicate with rack aggregation layer device 130 using those ports 112 connected directly to ports 132 and not via the network nodes 120A-B. These connections represent a dedicated network capacity allocated to the rack switches 110A-D.

The connections between network node ports 124 and rack aggregation layer device ports 132 represent a burst network capacity that can be automatically allocated among the rack switches 110A-D based on changing network conditions.

A port allocation controller 140 is configured to use time-division multiplexing to share access to the burst network capacity among the rack switches 110A-D. The port allocation controller 140 can be coupled to network node switches 120A-B and configured to dynamically switch which of network node ports 122 are coupled to which of network node ports 124. In some embodiments, port allocation controller 140 is configured to allocate and de-allocate network node ports 124 to and from rack switches 110A-D in response to changing network traffic patterns. If network traffic for a given rack switch is close to reaching the dedicated network capacity for the given rack switch (e.g., 50%, 75%, 90%, or another percentage of network capacity), port allocation controller 140 can allocate one or more of network node ports 124 to the given rack switch to transfer additional network traffic. This can be done, for example, by mapping one or more of network node ports 124 connected to rack aggregation layer device 130 to one or more of the network node ports 122 connected to the given rack switch. This creates an additional connection for transmitting data between the given rack switch and the rack aggregation layer device 130. If network traffic for the given rack switch then drops below a given level, the port allocation controller 140 can then de-allocate the one or more of network node ports 124 from the given rack switch.

Port allocation controller 140 optionally receives network capacity utilization metrics from the rack switches 110A-D and/or the rack aggregation layer device 130. Such utilization metrics can indicate the amount of available network capacity that is currently being used by network traffic travelling between the rack switches 110A-D and the rack aggregation layer device 130. Port allocation controller 140 can use the network capacity utilization metrics to determine whether or not a current allocation of burst capacity among the server rack switches 110A-D should be adjusted.

Alternatively, rack aggregation layer device 130 and/or rack switches 110A-D can be configured to transfer network capacity utilization metrics to a network utilization service running on another server connected to the network (not shown). In such cases, port allocation controller 140 can optionally receive the utilization metrics from the network utilization service. Such a configuration can have the advantage of offloading the calculation of the utilization metrics to the other server. For example, the rack aggregation layer device 130 and/or rack switches 110A-D can be configured to transfer raw (or unprocessed) network traffic data to the network utilization service. The network utilization service can then use the raw (or unprocessed) network traffic data to generate the utilization metrics, which then can be transmitted to the port allocation controller 140.

Although FIG. 1 depicts four rack switches and two network nodes, other numbers of rack switches and network nodes are also possible. The capacities of the ports of the network nodes, rack switches, and rack aggregation layer device can be factors when determining a ratio between network nodes and rack switches. As described in more detail below, in some scenarios the ratio of network nodes to rack switches can be determined, at least in part, using a statistical model. Additionally, although only one rack aggregation layer device 130 is shown, the system can be extended to multiple rack aggregation layer devices.

Three ports 112 are depicted in FIG. 1 for each of server rack switches 110A-D; however, it is possible for the server rack switches to contain other numbers of ports 112. It is also possible for the server rack switches to have varying numbers of ports. Similarly, although eight ports 132 are depicted for rack aggregation layer device 130, other numbers of ports 132 are possible. Likewise, other numbers of network node ports 122 and 124 than those depicted are possible as well.

In some embodiments, direct connections between the rack switches 110A-D and the rack aggregation layer device 130 are omitted. In such embodiments, all network traffic between rack switches 110A-D and the rack aggregation layer device 130 passes through the network nodes 120A-B. In these cases, rack switches 110A-D may not have dedicated network capacities and all network capacities allocated to the rack switches 110A-D are determined by port allocation controller 140. Such embodiments have the potential advantage of giving the port allocation controller more complete control over the utilization of the available network capacity of rack aggregation layer device 130. However, a potential disadvantage is a lag in data transfer times (i.e., latency) introduced by the additional step of transmitting all network traffic through the network nodes 120A-B.

Figure 2A:
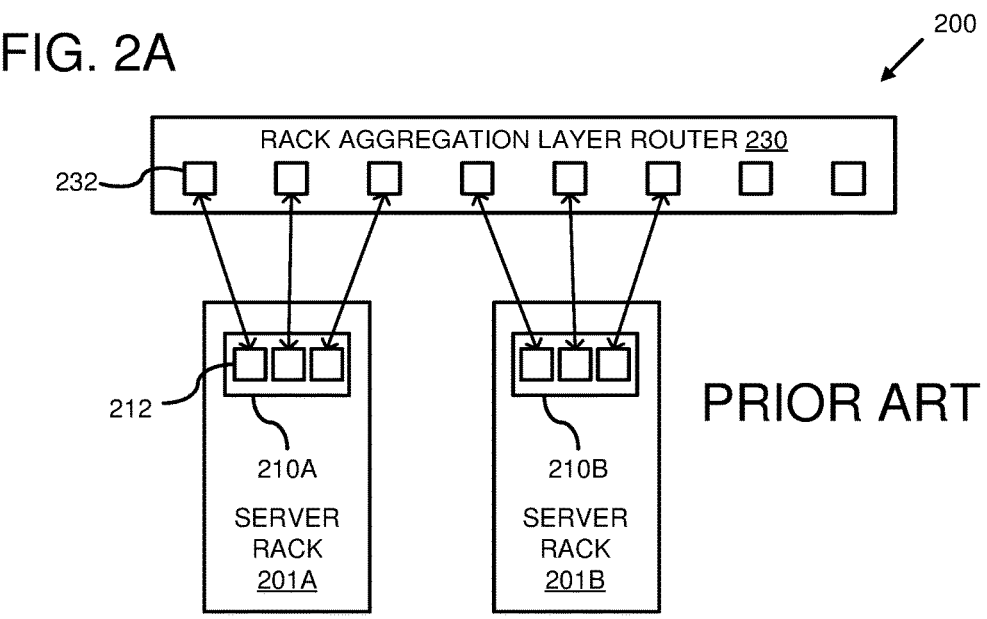
FIG. 2A is an example system diagram of a prior art configuration, wherein multiple server racks are connected to a rack aggregation layer router.
Figure 2B:
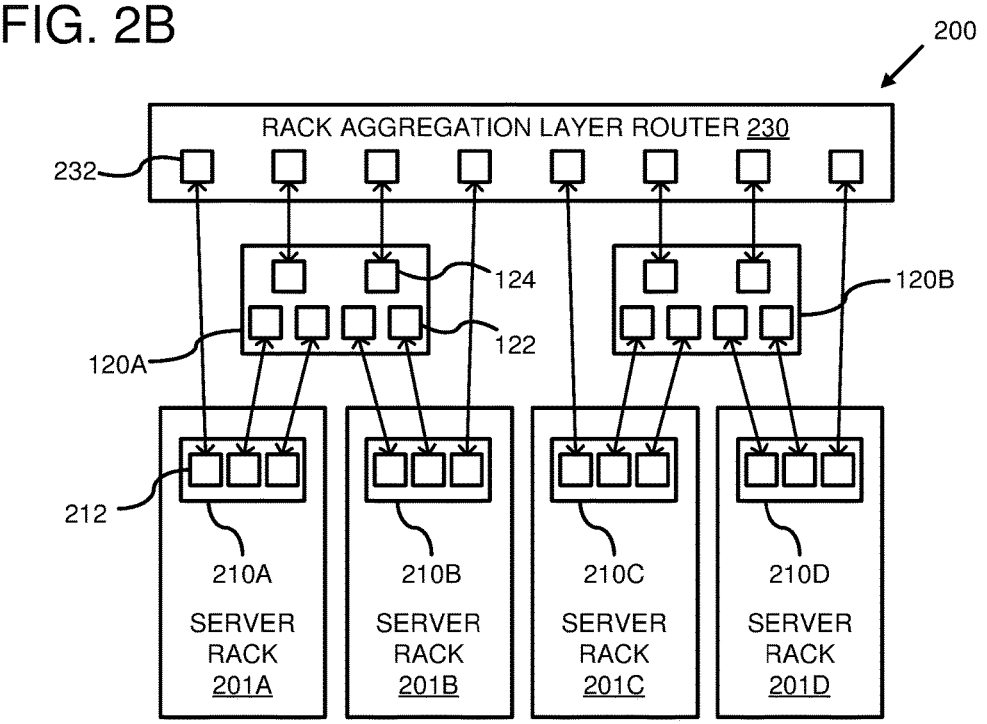
FIG. 2B is an example system diagram illustrating an increase in network capacity utilization created by using network nodes.

Using the network nodes as an intermediate layer between rack switches and a rack aggregation layer device allows more rack switches to be connected to the rack aggregation layer device than is possible when server rack switches are only connected directly to the rack aggregation layer device. This can be seen in FIG. 2B, where additional top-of-rack switches 210C-D for server racks 201C-D are connected to rack aggregation layer router 230 by introducing network nodes 120A-B into example system 200.

In this configuration, the network nodes 120A-B are potentially oversubscribed. For example, four of network node 120A's ports 122 are connected to ports 212 of top-of-rack switches 210A-B, whereas only two of network node 120A's ports 124 are connected to rack aggregation layer router 230. However, since the network capacity of network node 120A can be dynamically allocated between top-of-rack switches 210A-B based on changing network conditions, the effective total network capacity of the top-of-rack switches 210A-D is not reduced.

The term "port," as used herein, refers to a component of a computer or telecommunications device that, when physically connected to another device, facilitates communication with the other device. Communication across a port can be one-way or bi-directional. Bi-directional communication across a port can be half-duplex or full-duplex. A device can have multiple ports capable of one-way, half-duplex, and/or full-duplex communication.

Ports of devices can be connected to each other using various types of physical connections, such as fiber optic cables and copper wire cables. Fiber optic cables have higher capacities than copper cables, but can be more expensive and can be more susceptible to signal degradation over long distances. Copper cables are less expensive, but have lower capacities than many optical cables. Various combinations of multiple cable types are also possible. For instance, copper cables may be used to connect rack switches to servers within the server racks, while fiber optic cables may be used to connect the rack switches to rack aggregation layer devices and/or network nodes.

In any of the examples described herein, the term "uplink port" refers to a device's port that is connected to another device at a higher layer in a network topology. For instance, in FIG. 1, ports 112 can be characterized as "uplink ports" because they are connected to devices at higher layers in a network topology (i.e., network nodes 120A-B and rack aggregation layer device 130). Similarly, ports 124 can also be characterized as "uplink ports" because they are connected to rack aggregation layer device 130, which is higher in the network topology than network nodes 120A-B.

In any of the examples described herein, the term "downlink port" refers to a device's port connected to another device at a lower layer in a network topology. For instance, in FIG. 1, ports 132 can be characterized as "downlink ports" because they are connected to devices at a lower layer in the network topology (i.e., rack switches 110A-D and network nodes 120A-B). Similarly, ports 122 of network nodes 120A-B can be characterized as "downlink ports" because they are connected to devices at a lower layer in the network topology (i.e. rack switches 110A-D).

In any of the examples described herein, "network capacity" or "capacity" refers to a maximum possible rate of data transfer across a network communication channel in a given timespan. Example measurements of network capacity include kilobits per second (kbps), megabits per second (Mbps), and gigabits per second (Gbps). In some embodiments, network capacity of a device is defined in terms of the capacity of the device's ports and the number of ports the device can use to communicate across a given communication channel. For example, if a rack switch has one port connected to a rack aggregation layer device, then the rack switch's network capacity can be the capacity of the one port. Instead, if the rack switch has two ports connected to the rack aggregation layer device, then the network capacity of the rack switch can be the combined capacity of both the connected ports. Protocols, such as the equal cost multi-path routing protocol (ECMP) can be used to transfer data from a source to a single destination using multiple ports.

In any of the examples described herein, a network node can be an electronic device attached to a network and capable of creating, receiving, and/or transmitting information over one or more communications channels. For example, a network node can be any computer or other communications device operable to selectively route traffic between various ports of the communication device.

In some embodiments, networking nodes are networking switches that contain mapping lists for routing network traffic, such as programmable forwarding tables or access control lists (ACLs). A mapping list can be used to map ports on the network node so that data received on certain ports will be transferred to mapped ports and not to unmapped ports. In such embodiments, when a network node port connected to a rack switch is mapped to another network node port that is connected to a rack aggregation layer device, the rack switch and rack aggregation layer device will be able to communicate with one another via the mapped network node ports. Whereas, if the ports connected to the rack switch and the rack aggregation layer device are not mapped, or are later unmapped, then the rack switch and rack aggregation layer device will not be able to communicate via the network node.

In some embodiments where network nodes are networking switches, a port allocation controller can allocate network node capacity to rack switches by automatically reprogramming the mapping lists of the network nodes. This can be accomplished by sending messages or commands from the port allocation controller to agent processes running on the network node switches. The agent processes, responsive to the messages or commands from the port allocation controller, can execute commands on the network node switches to reprogram the network node switch mapping lists.

Network nodes can also be microelectricalmechanical switches (MEMS) with reprogrammable physical layouts. The physical layout of a MEMS can be dynamically reprogrammed to create and remove connections between ports on the MEMS. In such embodiments, when a connection is created between a network node port connected to a rack switch and another network node port connected to a rack aggregation layer device, the rack switch and rack aggregation layer device will be able to communicate with one another via the created connection. Whereas, if the connection between the ports is removed, then the rack switch and rack aggregation layer device will no longer be able to communicate with each other via the network node.

In some embodiments where network nodes are MEMS, a port allocation controller can allocate network node capacity to rack switches by automatically creating connections between the MEMS ports. This can be accomplished, in some cases, by sending messages from the port allocation controller to an application programming interface (API) of the MEMS. The MEMS, responsive to API calls made by the port allocation controller, can dynamically reprogram the physical layout of the MEMS to create and/or remove connections between the MEMS ports.

A network node connected to one or more rack switches and a rack aggregation layer device can be referred to as a burst node.

In any of the examples described herein, a port allocation controller can be one or more server computers or other computing devices configured to communicate with one or more network nodes. The communication between the port allocation controller and network nodes can be via wired or wireless connections. The port allocation controller can be directly connected to the one or more network nodes. Alternatively, the port allocation controller can communicate with the one or more network nodes via a network. In some embodiments, the port allocation controller communicates with the one or more network nodes using the same network as the rack switches and the rack aggregation layer device. In other embodiments, the port allocation controller communicates with the one or more network nodes via a separate network.

Optionally, the port allocation controller can be configured to receive network capacity utilization metrics from various sources, such as rack switches, rack aggregation layer devices, and/or network utilization services. Wired and/or wireless connections between the port allocation controller and the source(s) can be used by the port allocation controller to receive the utilization metrics. The port allocation controller can be directly connected to the source (s). Alternatively, the port allocation controller can communicate with source(s) via a network. In some embodiments, the port allocation controller communicates with the source (s) using the same network as the rack switches and the rack aggregation layer device. In other embodiments, the port allocation controller communicates with source(s) via a separate network.

In any of the examples described herein, a rack aggregation layer device can be a computer or network communications device comprising multiple ports and configured to act as an intermediary between devices organized below the rack aggregation layer device and the rest of a network, such as an aggregation switch or aggregation router. Examples of devices organized below the rack aggregation layer device can include rack switches and one or more network nodes. In some embodiments, a rack aggregation layer device creates a virtual local area network (VLAN) containing the devices organized below the rack aggregation layer device.

Figure 3:
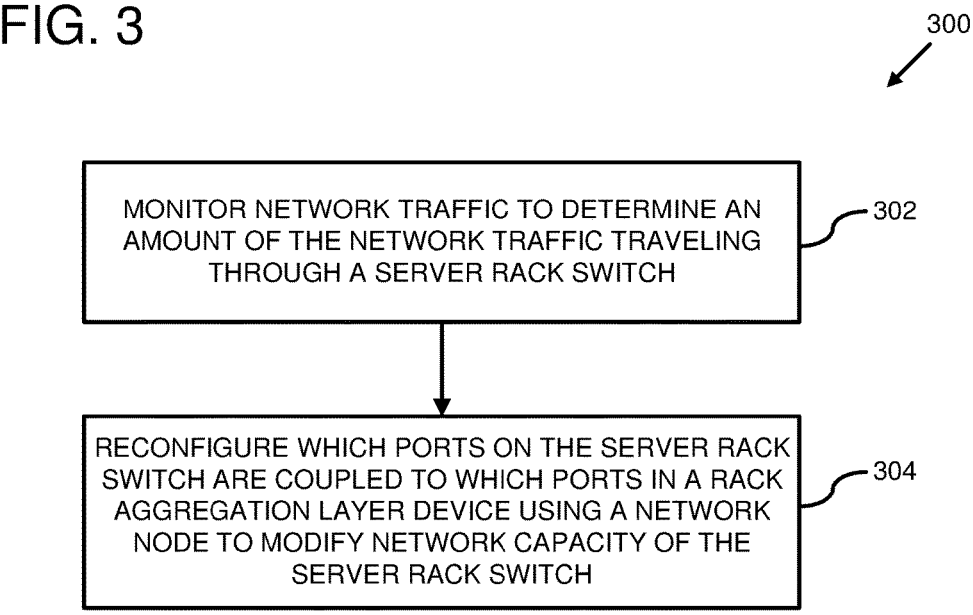
FIG. 3 is a flowchart of an example method of dynamically augmenting the network capacity of a server rack switch using a network node.

FIG. 3 is a flowchart of an example method 300 of dynamically augmenting the capacity of a server rack switch using a network node.

At 302, network traffic is monitored to determine an amount of the network traffic traveling through a server rack switch. The monitoring can be performed using a port allocation controller. In some embodiments, a port allocation controller monitors network capacity utilization metrics received from the server rack switch. Alternatively, the utilization metrics can be received from a source other than the server rack switch, such as a centralized server. These utilization metrics can indicate what amount, if any, of the server rack switch's available network capacity is currently being used by network traffic traveling to and from the server rack switch. The utilization metrics also can indicate average utilization of the server rack switch's available network capacity over a given period of time. Such utilization metrics can be used to identify changing trends in network capacity utilization for the server rack switch.

At 304, based on the monitoring of the network traffic, a reconfiguring of which ports on the server rack switch are coupled to which ports in a rack aggregation layer device is performed using a network node in order to modify the network capacity of the server rack switch. In embodiments where a port allocation controller is used to monitor the network traffic, the port allocation controller can also be used to reconfigure the coupling of the ports using the network node. In some embodiments, the reconfiguring is based on a statistical model.

One or more uplink ports of the server rack switch can be connected to one or more downlink ports of the network node. One or more uplink ports of the network node can also be connected to one or more downlink ports of the rack aggregation layer device. The network node can be reconfigured to connect the one or more network node downlink ports with the one or more network node uplink ports, thereby coupling the one or more server rack switch uplink ports with the one or more rack aggregation layer device downlink ports.

In embodiments where the network node is a network switch with a reprogrammable mapping list, the network node uplink and downlink ports can be connected by reprogramming the list to map the one or more uplink ports to the one or more downlink ports. For example, the port allocation controller can transmit a message to the network node and, responsive to receiving the message, the network node's list can be updated to give the server rack switch access to one or more of the downlink ports of the rack aggregation layer device via the network node. In some embodiments, the message is transmitted by the port allocation controller to an agent process running on the network node. In such embodiments, the agent process updates the list of the network node in response to receiving the message from the port allocation controller.

Although a single server rack switch and a single network node are described in the example, method 300 is applicable to scenarios involving multiple server rack switches and/or multiple network nodes.

In any of the examples described herein, the port allocation controller can keep records of which server rack switches are connected to which network nodes. The port allocation controller can also keep records of which network node ports connected to a rack aggregation layer device are mapped to which network node ports connected to server rack switches. Based on network traffic for a given server rack switch, the port allocation controller can use these records to identify the one or more network nodes to which the server rack switch is connected and to reconfigure one or more of the identified network nodes to map one or more network node ports connected to a rack aggregation layer device to one or more network node ports connected to the server rack switch. This mapping can involve mapping one or more network node ports that are not currently mapped and/or re-mapping network node ports that are already mapped to other server rack switches.

Figure 4:
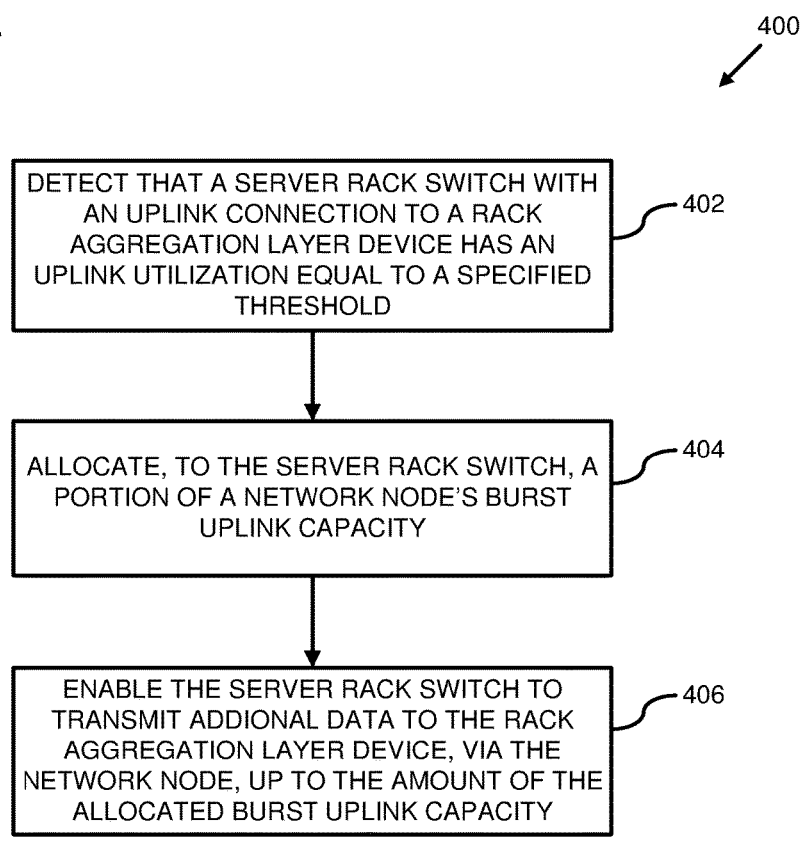
FIG. 4 is a flowchart of another example method of dynamically augmenting the network capacity of a server rack switch using a network node when the server rack switch has an uplink utilization equal to a specified threshold.

FIG. 4 is a flowchart of another example method 400 of dynamically augmenting the network capacity of a server rack switch using a network node.

At 402, a detection is made that a server rack switch with an uplink connection to a rack aggregation layer device has an uplink utilization equal to a specified threshold. The uplink connection is used to transmit data between the server rack switch and the rack aggregation layer device. In some embodiments, the uplink connection is a connection between one or more uplink ports of the server rack switch and one or more downlink ports of the rack aggregation layer device.

The uplink utilization of the server rack switch can be an amount of the uplink connection's capacity for transmitting data that is currently being used. The uplink utilization can alternatively be an average amount of the uplink connection's capacity that has been used over a given period of time. In cases where the uplink connection is a connection between one or more server rack switch uplink ports and one or more rack aggregation layer device downlink ports, the uplink utilization can be an amount of the physical capacity of the connection(s) between the ports. Alternatively, the uplink connection's capacity can be an artificial limit set at an amount below the physical capacity of the connection.

The specified threshold can be an amount of the uplink connection's capacity. In some embodiments, the specified threshold is an amount less than the total capacity of the uplink connection. The specified threshold can also be a percentage of a dedicated uplink capacity of the server rack switch to the rack aggregation layer device. The dedicated uplink capacity can be an amount of uplink capacity between the server rack switch and the rack aggregation layer device that is guaranteed to be available to the server rack switch. In such cases, the specified threshold can be selected as a percentage of the dedicated uplink capacity, such that an uplink utilization at or above the percentage indicates that the amount of data currently being transferred across the uplink connection is approaching the total dedicated uplink capacity.

The specified threshold can also account for rates of change in uplink utilization. For instance, a large relative increase in uplink utilization over a short period of time may trigger the detection at 402 at a lower overall uplink utilization than a more gradual relative increase over a longer period of time.

In some embodiments, the specified threshold is provided by an administrator. In other or further embodiments, the specified threshold is determined based on a statistical model.

In some embodiments, the detecting is performed, at least in part, by a port allocation controller. The port allocation controller can detect that the uplink utilization is equal to the specified threshold, at least in part, by monitoring uplink utilization metrics for the uplink connection. Such uplink utilization metrics can be generated by the server rack switch or, alternatively, by the port allocation controller or a network utilization service based on the amount of data that is transferred across the uplink connection. In some embodiments, the uplink utilization metrics include utilization metrics of the server rack switch's dedicated uplink capacity.

At 404, responsive to the detecting that the uplink utilization is equal to the specified threshold, a portion of a network node's burst uplink capacity is allocated to the server rack switch. The network node's burst uplink capacity can be the capacity of one or more uplink connections between the network node and a rack aggregation layer device. In some embodiments, a burst uplink connection comprises one or more uplink ports of the network node connected to one or more downlink ports of the rack aggregation layer device.

A portion of the network node's burst uplink capacity can be allocated to the server rack switch by associating one or more of the network node's uplink ports connected to the rack aggregation layer device with the server rack switch. This association can be a logical association, wherein one or more network node uplink port association records are updated to indicate that one or more network node uplink ports are associated with the server rack switch.

In some cases, the allocating is based, at least in part, on a burst uplink capacity utilization metric of the network node. The burst uplink capacity utilization metric can indicate the amount of the network node's burst uplink capacity that is currently being used to transfer data between the network node and the rack aggregation layer device. In embodiments where a port allocation controller performs at least a part of the detecting at 402, the port allocation controller can also perform, at least in part, the allocating at 404, including receiving the burst uplink capacity utilization metric from the network node.

At 406, the server rack switch is enabled to transmit additional data to the rack aggregation layer device via the network node, up to the amount of the allocated burst uplink capacity. In embodiments where burst uplink capacity of the network node comprises one or more uplink ports of the network node connected to one or more downlink ports of the rack aggregation layer device, the enabling can comprise granting the server rack switch access to at least one of the one or more network node uplink ports that was associated with the server rack switch at step 404.

In embodiments involving a port allocation controller, the port allocation controller can perform all or part of the enabling. For example, the port allocation controller can send a message to the network node, granting the server rack switch access to one or more of the network node's uplink ports. In embodiments where the network node is a network switch with a reprogrammable mapping list, such as a forwarding table or an ACL, the enabling can comprise reprogramming the list to map one or more network node downlink ports connected to the server rack switch with one or more of network node uplink ports connected to the rack aggregation layer device.

Figure 5:
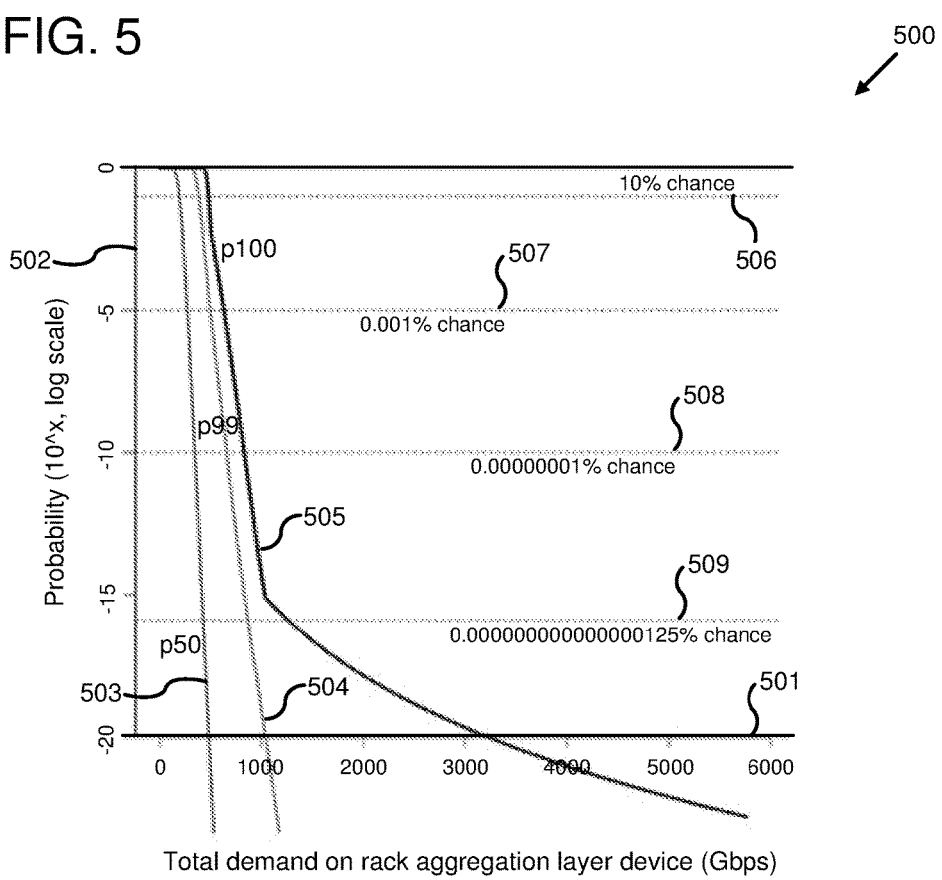
FIG. 5 depicts a chart of probabilities of observing various amounts of total network demand on a given rack aggregation layer device in an example data center based on a statistical model.

FIG. 5 depicts a chart 500 of probabilities of observing various amounts of total network demand on rack aggregation layer devices in an example data center. The results shown in chart 500 were generated using a statistical model based on observed network demand on server rack switches in the example data center over a month and a half time period. Various mixtures of server rack switches in the example data center were sampled. For each mixture of server rack switches, the highest network traffic values observed on each server rack switch were added together to create a sum of peaks for each server rack switch mixture. A distribution over all possible samples was then computed using the central limit theorem. In particular, a special case of the central limit theorem for log normal distributions was used in order to avoid underestimating long tails in observed peak distributions. In other embodiments, other methods can be used to generate the statistical model.

The statistical model was then applied to observed rack aggregation layer devices in the example data center, wherein the observed rack aggregation layer devices are connected to various mixtures of server rack switches, to obtain the results illustrated in chart 500. The x-axis 501 represents total demand on a rack aggregation layer device in the example data center in gigabits per second (Gbps). The y-axis 502 represents probabilities as negative powers of ten, and is presented on a logarithmic scale in order to make chart 500 easier to read. Curves 503-505 represent quantiles. Curve 503 represents the fiftieth percentile, meaning that fifty percent of all observed rack aggregation layer devices have probabilities for reaching the given total network demands that fall at or below curve 503. Curve 504 represents the ninety ninth percentile, meaning that ninety nine percent of all observed rack aggregation layer devices have probabilities of reaching the given total network demands that fall at or below curve 504. Curve 505 is the curve for the one hundredth percentile and represents the probability that the rack aggregation layer device with the most aggressive mixture of server rack switches will reach certain amounts of total network demand. Lines 506-509 indicate certain of the probabilities of the y-axis 502 and characterize them as percentage chances. The points at which curves 503-505 intersect lines 506-509 indicate the chances that rack aggregation layer devices at the respective percentiles have of reaching certain total demands. For example, it can be seen from the point where curve 505 intersects line 508 that there is less than a one in ten billion (0.00000001%) chance that any given rack aggregation device in the example data center will experience a total network demand that exceeds one thousand Gbps. It can also be seen from the point where curve 504 intersects line 509 that, for ninety nine percent of the rack aggregation devices in the example data center, the chances of experiencing a total demand of one thousand Gbps is less than 0.000000000000000125%.

In any of the examples described herein, a statistical model, such as the one described above, can be used to apportion total capacity of a rack aggregation layer device among server rack switches and network nodes. A dedicated, or steady-state, amount of the total capacity that is statistically unlikely to be exceeded during normal operating conditions can be allocated to, and divided among, the various server rack switches connected to the rack aggregation layer device. Alternatively, the dedicated capacity and a per-rack switch dedicated capacity can be used to determine the number of rack switches that can be connected to the rack aggregation layer device. All or part of the remaining capacity of the rack aggregation layer device can be allocated to one or more network nodes to be distributed among the various server rack switches based on changing network conditions. In this way, more server rack switches can be connected to a rack aggregation layer device while ensuring, with a statistically high degree of certainty, that the total effective capacity available to the server rack switches has not been reduced.

The statistical model can also be used to determine a ratio of server rack switches to network nodes that should be connected to a given rack aggregation layer device. Adding a higher number of network nodes will mean that each individual network node will have a smaller percentage of the overall burst capacity to be allocated to the server rack switches connected to the network node. This may ensure that burst capacity is more evenly distributed across the server rack switches, but it increases the risk that a given server rack switch will encounter an increase in demand that exceeds its dedicated capacity plus all the burst capacity available. Adding a smaller number of network nodes reduces the risk that any given server will experience an increase in demand that exceeds the available capacity, but increases the risk that a small number of the server rack switches will monopolize all of the available burst capacity. The statistical model can be used to determine a ratio of network nodes to server rack switches that minimizes these risks.

Figure 6:
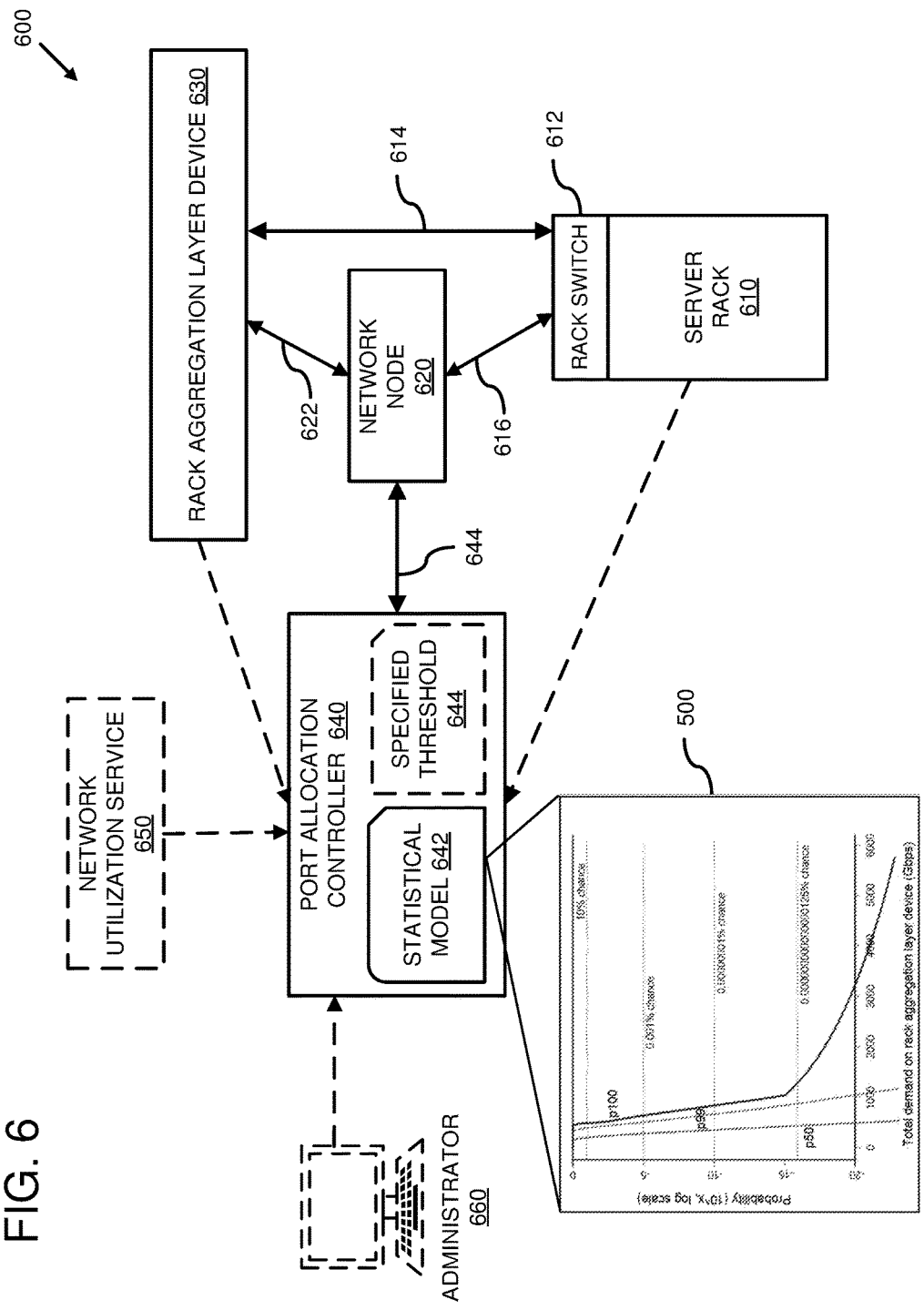
FIG. 6 is an example system diagram illustrating a port allocation controller configured to alter network capacity for a server rack switch based on a statistical model and network utilization data received from various sources.

FIG. 6 is a diagram of example system 600, wherein a port allocation controller is configured to alter network capacity for a server rack switch based on a statistical model and network utilization data from various sources.

Server rack 610 comprises rack switch 612 and multiple servers (not illustrated) coupled to rack switch 612, wherein rack switch 612 is configured to transfer network traffic between the multiple servers and the rest of a network.

Rack switch 612 is connected to rack aggregation layer device 630 by connection 614. Connection 614 can comprise one or more uplink ports of rack switch 612 connected to one or more downlink ports of rack aggregation layer device 630. Rack switch 612 is also connected to network node 620 by connection 616. Connection 616 can comprise one or more uplink ports of rack switch 612 connected to one or more downlink ports of network node 620. Network node 620 is also connected to rack aggregation layer 630 by connection 622. Connection 622 can comprise one or more uplink ports of network node 620 connected to one or more downlink ports of rack aggregation layer 630.

Port allocation controller 640 comprises statistical model 642. Statistical model 642 can be a statistical model similar to the one discussed above with reference to chart 500. Other types of statistical models are also possible. Port allocation controller 640 is connected to network node 620 by connection 644. Connection 644 can be one or more wireless connections, one or more physical connections, or some combination thereof. Port allocation controller 640 is configured to receive data pertaining to the network utilization of various devices, such as rack switch 612, network node 620, and/or rack aggregation layer device 630. The network utilization data indicate utilization levels of network capacities of the various devices. The network utilization data can come from the devices themselves or, alternatively, some or all of the network utilization data can come from a network utilization service 650. The port allocation controller 640 is configured to allocate a portion of the network node 620's burst uplink capacity to rack switch 612 based on statistical model 640 and the network utilization data.

Optionally, port allocation controller also comprises a specified threshold 644. In some embodiments, specified threshold 644 is generated using, at least in part, statistical model 642. Alternatively, in some embodiments, port allocation controller 640 can be configured to receive specified threshold 662 from an administrator 660.

Figure 7:
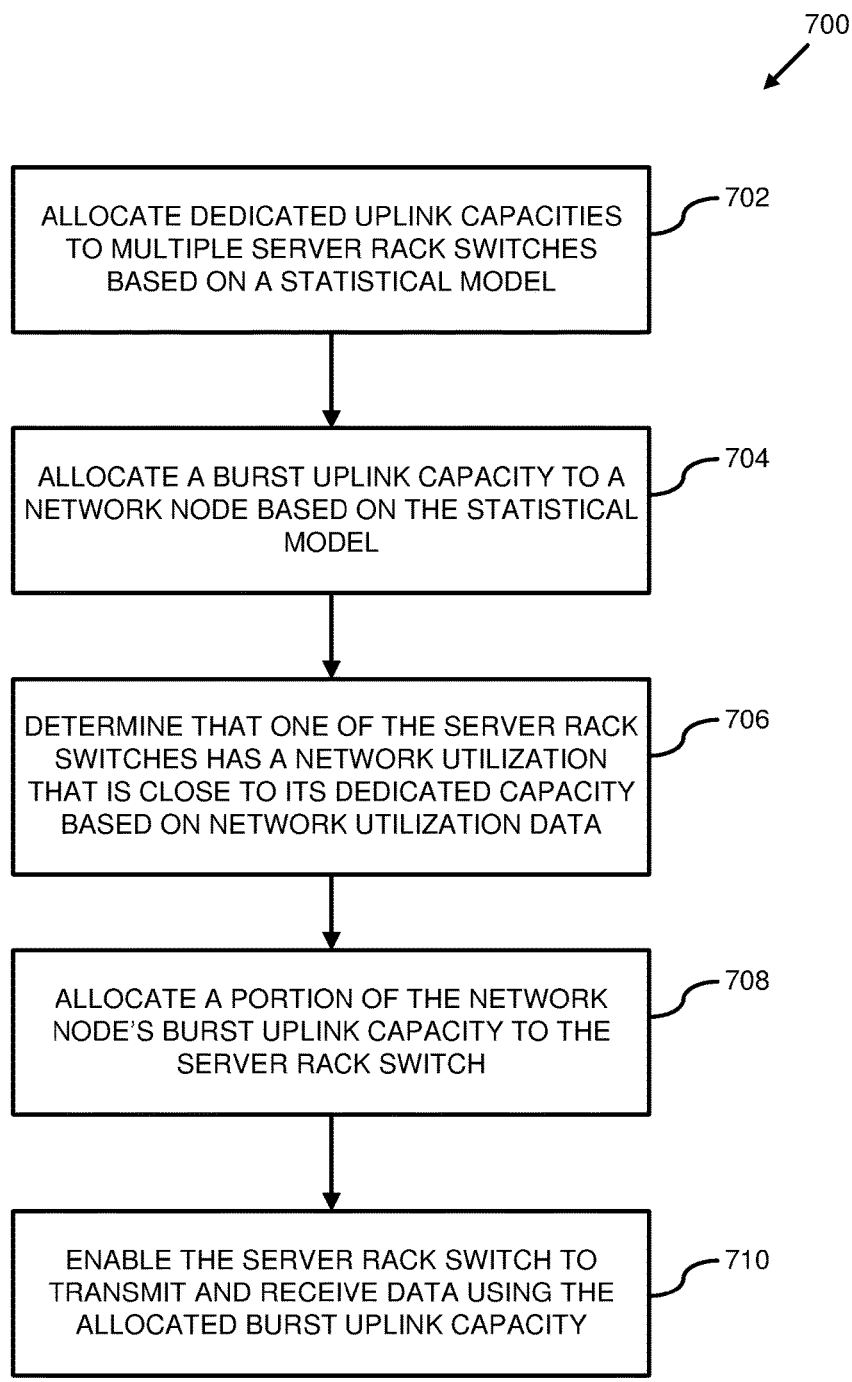
FIG. 7 is a flowchart of another example method of dynamically augmenting network capacity of a server rack switch based, at least in part, on a statistical model.

FIG. 7 is a flowchart of an example method 700 of dynamically augmenting network capacity of a server rack switch based on a statistical model and network utilization data.

At 702, dedicated uplink capacities are allocated to multiple server rack switches based on a statistical model. The dedicated capacity of a server rack switch can be an amount of network capacity that the rack switch is predicted to not exceed within a certain probability. In system 600, a dedicated uplink capacity can be a portion of rack aggregation layer device 630's total network capacity that is allocated to rack switch 612 based on statistical model 642. The dedicated network capacity allocated to server rack switch 612 can be the network capacity of connection 614.

At 704, a burst uplink capacity is allocated to a network node based on the statistical model. Total burst capacity of a rack aggregation device can be determined using the statistical model. For example, the total burst capacity can be determined by identifying a portion of the rack aggregation layer device's total capacity that is unlikely to be used by any server rack switches except in statistically rare circumstances. In some embodiments, the burst capacity of a rack aggregation layer device is identified as the total capacity less the combined dedicated capacities of all server rack switches connected to the rack aggregation layer device. The burst capacity of the rack aggregation layer device can be thought of as a pool of extra capacity that can be allocated among server rack switches based on changes in network capacity utilization. In other scenarios, the statistical model can be used to determine dedicated and burst capacity amounts in such a way that it is statistically probable that some portion of the burst capacity will be used at any given time, but it is statistically improbable that all of the burst capacity will be used at any given time. Such an arrangement is more aggressive and allows even more rack switches to be connected to a rack aggregation layer device, but it increases the risk that unforeseen network conditions will create a network demand on a given rack switch that exceeds the available capacity.

The burst uplink capacities the network nodes are created by allocating a portion of the rack aggregation device's total burst capacity to each network node connected to the rack aggregation layer device. In system 600, a portion of rack aggregation layer device 630's burst capacity can be allocated to network node 620 based on statistical model 642. The burst uplink capacity of network node 620 can be the capacity of connection 622 to rack aggregation layer device 630. In some scenarios, the amount of the burst uplink capacity of network node 620 is known by port allocation controller 640.

At 706, it is determined that one of the server rack switches has a network utilization that is close to its dedicated uplink capacity, based on network utilization data. Network utilization can be close to a server rack switch's dedicated uplink utilization if the network utilization is within a certain percentage of the dedicate uplink utilization. Alternatively, a specified threshold can be provided and a network utilization can be close to a server rack switch's dedicated uplink utilization when it is equal to or greater than the specified threshold. The network utilization data can come from various sources, such as the server rack switches, the network nodes, the rack aggregation layer device, a network utilization service, or some combination thereof. The network utilization data can indicate that the network utilization of the server rack's dedicated capacity has been increasing over a period of time and that, if the rate of increase continues for a specified period of time, the network demand on the server rack switch will exceed the server rack switch's dedicated capacity. The determining can be based, at least in part, on the statistical model. For example, the statistical model can be used in conjunction with the network utilization data to predict that network demand on the server rack switch will soon exceed the server rack switch's dedicated capacity. In some embodiments, the statistical model is used to generate a specified threshold that, when met or exceeded by network utilization, indicates that current network demand is close to exceeding the dedicated capacity.

In system 600, the port allocation controller 640 can determine that rack switch 612 is close to exceeding its dedicated capacity based on the network utilization data coming from rack switch 612, rack aggregation controller 630, and/or network utilization service 650. For example, based on the network utilization data, the port allocation controller 640 can determine that the amount of network traffic being transmitted across connection 614 is close to the capacity of connection 614. The port allocation controller can make this determination based on whether the network utilization data indicates that network utilization is equal to or greater than specified threshold 644. In some embodiments, specified threshold 644 is generated using statistical model 642. Alternatively, specified threshold 644 can be provided by administrator 660.

In some embodiments, network utilization service 650 is a process running on another server connected to the network. In such embodiments, the network utilization service optionally can receive network traffic data from rack switch 612 and/or rack aggregation layer device 630 and create the network utilization data based on the network traffic data received from rack switch 612 and/or rack aggregation layer device 630

At 708, a portion of the network node's burst uplink capacity is allocated to the server rack switch. The allocation can be based, at least in part, on the statistical model. For example, the statistical model can be used to determine a portion of a network node's burst uplink capacity that the server rack switch is statistically likely to need, given past network utilization trends of the server rack switch. The statistical model could also be used to determine an amount of a network node's burst uplink capacity that is statistically likely to be needed in the near future by other server rack switches connected to the network node.

In example system 600, port allocation controller 640 allocates a portion of network node 620's burst uplink capacity to rack switch 612. The allocation can be based, at least in part, on statistical model 642. The allocation can be a logical allocation wherein one or more network node capacity allocation records are created or modified by the port allocation controller. In such scenarios, the allocated burst capacity is reserved for rack switch 612 and is unavailable to allocate other server rack switches. However, rack switch 612 does not yet have access to the allocated burst capacity.

At 710, the server rack switch is enabled to transmit and receive data using the allocated burst uplink capacity of the network node. In embodiments where the uplink connection of the server rack switch to the network node comprises one or more server rack switch uplink ports connected to one or more network node downlink ports, the enabling can comprise mapping the one or more network node downlink ports to one or more network node uplink ports connected to the rack aggregation layer device. In embodiments where the network node is a programmable switch, enabling the allocated burst uplink capacity can comprise reprogramming the switch to allow the server rack switch's network traffic to travel to and from the rack aggregation layer via the network node. Once the allocated burst uplink capacity is enabled, network traffic can travel to and from the server rack switch via both the server rack switch's dedicated uplink capacity and the allocated burst uplink capacity.

In example system 600, port allocation controller 640 can enable rack switch 612 to transmit and receive data using the allocated network node uplink capacity by transmitting a message or command to network node 620 via connection 644. In embodiments where network node 620 is a reprogrammable switch, the message or command can comprise instructions to reprogram routes within the network node to allow network traffic to travel between rack switch 612 and rack aggregation layer device 630 via network node 620. After the enabling has been performed, network traffic for rack switch 612 will be able to continue to travel across connection 614 and additional network traffic for rack switch 612 will be able to travel across the additional connection between rack switch 612 and rack aggregation layer device 630 comprising connection 616, network node 620, and connection 622.

In at least some scenarios, enabling rack switch 612 to transmit and receive data using the allocated burst uplink capacity does not require any modification of rack switch 612. For example, in at least some embodiments where the enabling comprises mapping the one or more network node downlink ports to one or more network node uplink ports connected to the rack aggregation layer device, the rack switch 612 can automatically detect that the additional connection to rack aggregation layer device 630 via the network node 620 exists after the mapping is complete. This can be achieved, for example, by preconfiguring the rack switch 620 to associate the one or more rack switch 612 uplink ports that are connected to the network node 620's downlink ports with a network tunnel, such as an Internet Protocol (IP) tunnel or a Generic Routing Encapsulation (GRE) tunnel. When the one or more network node downlink ports are mapped to the one or more network node uplink ports, the ports can be associated with the network tunnel. Once the network node ports are associated with the network tunnel, the rack switch 612 will automatically detect that the new connection to the rack aggregation layer device 630 via the network node exists and will begin transmitting network traffic via the network tunnel to the rack aggregation layer device 630. Alternatively, a routing protocol, such as the Open Shortest Path First (OSPF) protocol, can be used. In such an embodiment, the rack aggregation layer device 630 can send a "hello" message to the rack switch 612 via network node 620 after the network node downlink and uplink ports are mapped. After the rack switch 612 receives the "hello" message via the one or more rack switch uplink ports connected to the one or more network node downlink ports, it can start transmitting network traffic to the rack aggregation layer device 630 via the network node 620.

Figure 8:
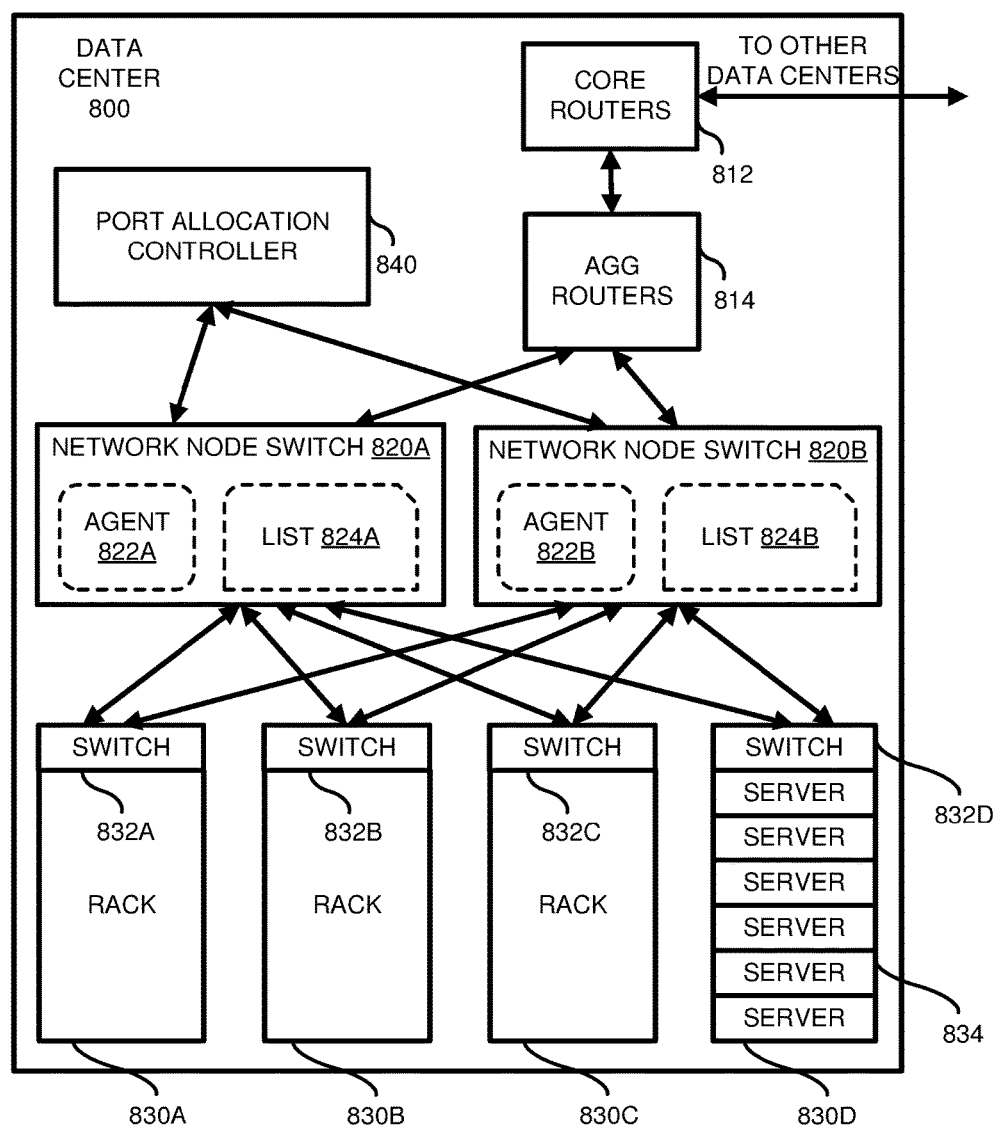
FIG. 8 is a system diagram illustrating network nodes and a port allocation controller deployed in an example data center.

FIG. 8 is a system diagram illustrating network nodes and a port allocation controller deployed in an example data center 800.

Example data center 800 comprises multiple server racks (e.g. server racks 830A-D), multiple aggregation layer routers 814, and multiple core routers 812. The core routers 812 have connections to the aggregation layer routers 814 as well as connections to core routers in other data centers and, optionally, other connections to a broader area network (not shown). The aggregation layer routers serve as an aggregation layer for the server racks. Other types of networking devices, such as switches, can be used instead of routers at the server rack aggregation layer. The server racks comprise top-of-rack switches 832A-D and multiple servers 834. Although servers 834 are only depicted in server rack 830D, server racks 830A-C also contain servers 834. Servers 834 are connected to top-of-rack switches 832A-D in their respective racks. The top-of-rack switches 832A-D are configured to transmit all network traffic between the connected servers 834 and the rest of the network.

Multiple network node switches (e.g. 820A-B) are deployed as an intermediate layer between the aggregation layer routers 814 and server racks 830. Although two network node switches are depicted, other numbers of network node switches are possible. The network node switches 820A-B comprise agents 822A-B and lists 824A-B. Lists 824A-B can be reprogrammable mapping lists, such as forwarding tables and/or ACLs. Agents 822A-B can be processes running on network node switches 820A-B configured to reprogram lists 824A-B, respectively.

Top-of-rack switches 832A-D are connected to network node switches 820A-B, which in turn are connected to aggregation layer routers 814. In this example, top-of-rack switches 832A-D are connected to both network nodes 820A-B. Network node switches 820A-B may be connected to the same aggregation layer router or different aggregation layer routers. Network node switches 820A-B can be automatically configured to allow network traffic to travel between the aggregation layer routers 814 and the top-of-rack switches 832A-D.

Port allocation controller 840 is configured to transmit messages to agents 822A-B to reprogram lists 824A-B, respectively, in order to couple the connections between the network node switches 820A-B and the top-of-rack switches 832A-B with the connections between the network node switches 820A-B and the aggregation layer routers 814. The port allocation controller 840 can transmit messages in response to observing network traffic patterns for the top-of-rack switches 832A-D. For example, if a particular server rack switch has a network utilization that has reached a specified threshold, port allocation controller 840 can transmit a message to couple one or more connections between the top-of-rack switch and one or more of the network nodes 820A-B with one or more connections between one or more of network nodes 820A-B and one or more of the aggregation layer routers 814. The one or more coupled connections can then be used to transmit additional network traffic between the top-of-rack switch and the one or more of the aggregation layer routers 814.

In some embodiments, the top-of-rack switches 832A-D have additional connections to the aggregation layer routers 814 that bypass the network nodes 820A-B (not illustrated). In these embodiments, network traffic can travel between the top-of-rack switches 832A-D and the aggregation layer routers 814 via these additional connections and bypass the network nodes 820A-B. In such embodiments, when connections between the top-of-rack switches 832A-D and the aggregation layer routers 814 are created by the network nodes 820A-B, network traffic can travel between the top-of-rack switches 832A-D and the aggregation layer routers 814 using both types of connections.

Figure 9:
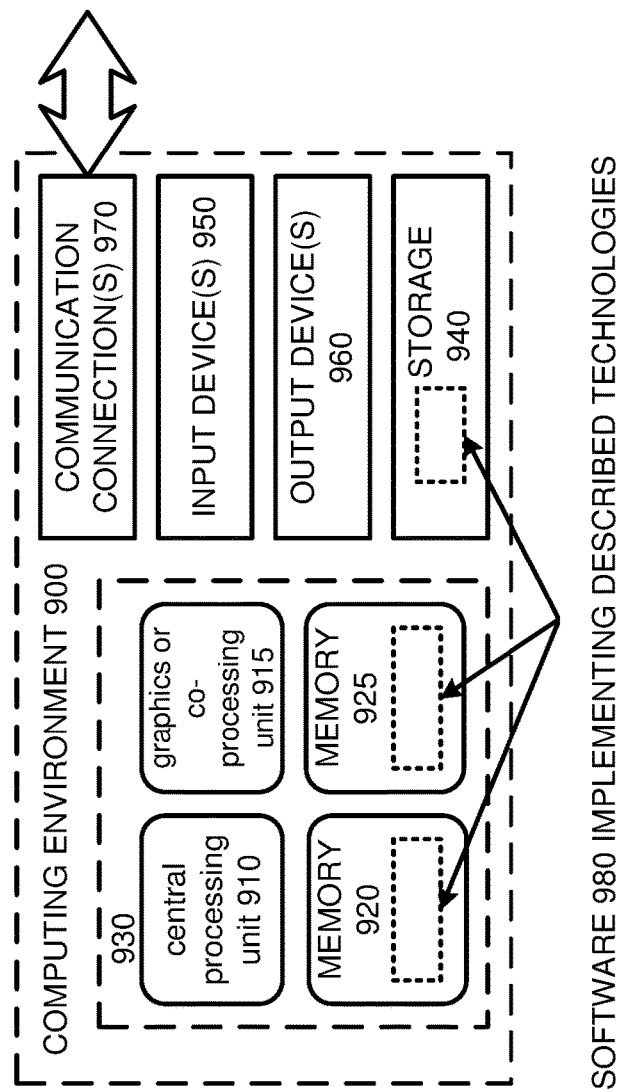
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

In some embodiments, the computing environment 900 can be used to implement a port allocation controller.

A computing system may have additional features. For example, the computing environment 900 includes storage 940, one or more input devices 950, one or more output devices 960, and one or more communication connections 970. In the case of a rack switch, network node, or rack aggregation layer device, communication connections 970 can comprise one or more communications ports. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). A computer-readable medium can be made up of multiple storage components, possibly distributed across multiple devices. The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system for dynamically modifying network connectivity in a data center, the system comprising:
    top-of-rack switches associated with server racks, wherein the top-of-rack switches include uplink ports;
    aggregation routers having downlink ports;
    network node switches coupled between the top-of-rack switches and the aggregation routers, wherein:
        a first group of the uplink ports in the top-of-rack switches bypass the network node switches and are coupled to one of the aggregation routers, and
        a second group of the uplink ports in the top-of-rack switches are coupled to one of the network node switches; and
    a port allocation controller coupled to the network node switches and configured to dynamically couple an uplink port, of the second group of the uplink ports, in one of the top-of-rack switches to one of the aggregation routers via the one of the network node switches, based on an amount of network traffic passing through the one of the top-of-rack switches.

2. The system of claim 1, wherein the network node switches are responsive to the port allocation controller to reprogram forwarding tables stored within the network node switches so as to perform the dynamic switching.

3. The system of claim 2, further including a agents executing within the network node switches, the agents configured to reprogram the forwarding tables in the network node switches in response to commands from the port allocation controller.

4. The system of claim 1, wherein one of the network node switches is a microelectromechanical switch that is responsive to an Application Program Interface (API) request from the port allocation controller to perform the dynamic switching.

5. The system of claim 1, wherein the port allocation controller uses statistical modeling of network traffic through the top-of-rack switches to determine how to perform the dynamic switching.

6. The system of claim 1, wherein the port allocation controller is further configured to perform the dynamic switching in response to detecting that the amount of traffic through one of the top-of-rack switches has reached a specified threshold.

7. A method, comprising:
    determining an amount of network traffic traveling through a server rack switch to a rack aggregation layer device via an uplink port of the server rack switch coupled to a downlink port of the rack aggregation layer device; and
    based on the determined amount of the network traffic:
        reconfiguring ports of a network node switch coupled between the server rack switch and the rack aggregation layer device, wherein the reconfiguring comprises mapping one or more uplink ports of the network node switch that connected to the rack aggregation layer device to one or more downlink ports of the network node switch that are connected to the server rack switch, and enabling the server rack switch to send additional network traffic to the rack aggregation layer device via the mapped ports of the network node switch, so as to modify network capacity of the server rack switch.

8. The method of claim 7, further comprising:

enabling the server rack switch to transmit additional data to the rack aggregation layer device via a separate connection from the server rack switch to the rack aggregation layer device that bypasses the network node switch.

9. The method of claim 7, wherein:

the determining comprises monitoring network traffic using a port allocation controller; and the reconfiguring comprises:

transmitting a message from the port allocation controller to the network node switch, and responsive to receiving the message, updating a list on the network node switch to give the server rack switch access to one of the ports in the rack aggregation layer device via the network node switch.

10. The method of claim 9, wherein the reconfiguring further comprises:

transmitting the message to an agent process running on the network node switch; and using the agent process to update the list.

11. The method of claim 7, wherein the reconfiguring is based on a statistical model.

12. The method of claim 7, further comprising:

allocating a dedicated network capacity to the server rack switch based on a statistical model;

allocating a burst network capacity to the network node switch based on the statistical model; and wherein the reconfiguring comprises allocating a portion of the network node switch's burst network capacity to the server rack switch.

13. A non-transitory computer-readable storage medium storing computer-executable instructions that, when executed, perform a method, the method comprising:

detecting that a server rack switch with an uplink connection to a rack aggregation layer device, through which the server rack switch transmits data to the rack aggregation layer device, has an uplink utilization that meets or exceeds a specified threshold;

allocating a portion of a network node switch's burst uplink capacity to the server rack switch, wherein the network node switch is coupled between the server rack switch and the rack aggregation layer device, and the allocating comprises mapping a downlink port of the network node switch that is connected to the server rack switch to an uplink port of the network node switch that is connected to the rack aggregation layer device; and enabling the server rack switch to transmit additional data to the rack aggregation layer device, via the mapped ports of the network node switch, up to the portion of the burst uplink capacity allocated to the server rack switch.

14. The computer-readable storage medium of claim 13, wherein the threshold is a percentage of a dedicated uplink capacity of the server rack switch to the rack aggregation layer device.

15. The computer-readable storage medium of claim 13, wherein the detecting is based on a dedicated uplink capacity utilization metric of the server rack switch.

16. The computer-readable storage medium of claim 13, wherein the allocating is based on a burst uplink capacity utilization metric of the network node switch.

17. The computer-readable storage medium of claim 13, wherein:

the detecting, allocating, and enabling are performed by a port allocation controller;

the allocating further comprises associating the server rack switch with the uplink port of the network node switch; and the enabling comprises granting the server rack switch access to the rack aggregation layer device via the associated uplink port of the network node switch.

18. The computer-readable storage medium of claim 17, wherein the detecting comprises receiving uplink capacity utilization data from the server rack switch at the port allocation controller.

19. The computer-readable storage medium of claim 17, wherein the allocating comprises receiving burst uplink capacity utilization data from the network node switch at the port allocation controller.

20. The one or more computer-readable storage media of claim 17, wherein the detecting comprises receiving uplink capacity utilization data from a network utilization service at the port allocation controller.

* * * * *

UNITED STATES PATENT AND TRADEMARK OFFICE
CERTIFICATE OF CORRECTION

PATENT NO. : 10,257,031 B1
APPLICATION NO. : 15/055267
DATED : April 9, 2019
INVENTOR(S) : Lamoreaux et al.

It is certified that error appears in the above-identified patent and that said Letters Patent is hereby corrected as shown below:

In the Claims

In Claim 3, Column 18, Line 34, "a agents" should read -- agents --.

Signed and Sealed this
Sixth Day of September, 2022

Katherine Kelly Vidal
*Director of the United States Patent and Trademark Office*